Patented Sept. 22, 1953

2,653,163

UNITED STATES PATENT OFFICE 2,653,163

GENTISYL p-AMINOSALICYLATES AND METHOD OF PREPARING SAME

Robert Michel Jacob, Ablon-sur-Seine, France, assignor to Societe des Usines Chimiques Rhone-Poulenc, Paris, France No Drawing. Application July 25, 1952, Serial No. 300,965. In France July 30, 1951

7 Claims. (Cl. 260—471)

This invention relates to organic esters and has for its particular object to provide new derivatives of gentisic acid that possess useful anti-tuburcular activity and, therefore, have application in human and veterinary therapy.

The new compounds of the present invention are gentisyl p-amino-salicylates of the following formulae:

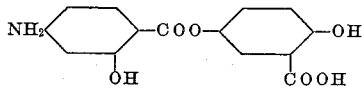

i. e. 3'-carboxy-4'-hydroxyphenyl 2-hydroxy-4-amino-benzoate

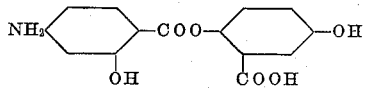

i. e. 2'-carboxy-4'-hydroxyphenyl 2-hydroxy-4-amino-benzoate.

According to a feature of the present invention, the said gentisyl esters are prepared by reacting gentisic acid with 2-hydroxy-4-nitrobenzoyl chloride, or a corresponding compound in which the 2-hydroxy group is acylated, in an anhydrous organic solvent medium in the presence of a tertiary base, separating the isomeric products by crystallisation from a solvent such as benzene, hydrolysing any 2-acyl group present in the isomeric products and subjecting the products to reduction.

The products first formed are the two gentisyl esters of 2-hydroxy (or acyloxy)-4-nitrobenzoic acid. By hydrolysis of the 2-acyloxy compounds these also are converted to the gentisyl esters of 2-hydroxy-4-nitrobenzoic acid and by reduction the 4-nitro groups are converted to amino groups, producing the two gentisyl esters of p-aminosalicylic acid.

The first step in the synthesis is preferably effected using 2-carbethoxyoxy-4-nitrobenzoyl chloride in a medium consisting of dioxan. The carbethoxy groups in the two nitro-esters obtained may be removed, for example, by hydrolysing with excess dilute ammonia or with the stoichiometric proportion of dilute sodium hydroxide. The gentisyl esters of 2-hydroxy-4-nitrobenzoic acid thus obtained may conveniently be reduced by catalytic hydrogenation in the presence of Raney nickel catalyst, though any method of reducing a nitro group to an amino group may be employed.

The following example will serve to illustrate the invention:

Example

Anhydrous gentisic acid (152 g.) is dissolved in dry dioxan (1,250 c. c.) and dimethylaniline (252 g.) is added. Keeping the temperature between 15 and 20° C. with vigorous agitation in a current of nitrogen, a solution of 2-carbethoxy-oxy-4-nitro-benzoyl chloride (273 g.) in dioxan (500 c. c.) is run in over a period of 1 hour. The mixture is left to stand for two days at ordinary temperature and is then run into water (3 litres) acidified with 10 N sulphuric acid (150 c. c.) with agitation. The oil which separates is extracted with ether (1 litre). On evaporating the ether there is obtained an oily residue (630 g.) which is dissolved in boiling benzene (1.5 litres). The mixture is diluted with a further litre of benzene and left to crystallise. The solid is filtered off, washed with benzene and dried. Crude 2'-carboxy - 4' - hydroxy-phenyl 2 - carbethoxyoxy-4-nitro-benzoate (154 g.) is obtained, melting at 138°–140° C. with resolidification and melting a second time at 190–192° C. This product is suspended in water (1 litre), cooled to +3° C., and 2 N ammonia (572 c. c.) is added over a period of 1½ hours with agitation in a current of nitrogen and cooling to +3° C. A red solution is obtained which is kept for a further hour at 0° C. and is then made acid to Congo red by the addition of 10 N sulphuric acid (74 c. c.) The product which crystallises is filtered off, washed and dried, giving 2'-carboxy-4'-hydroxy-phenyl 2-hydroxy-4 nitro-benzoate, M. P. 165° C., which after recrystallisation from dilute acetic acid melts at 205–210° C. with decomposition.

By the reduction of this product, dissolved in 10 times its weight of ethyl acetate, in the presence of Raney nickel at 80° C. under a hydrogen pressure of 50 kg./cm.$^2$ there is obtained 2'-carboxy - 4' - hydroxy-phenyl 2-hydroxy-4-amino-benzoate, M. P. 210–215° C. with decomposition. The hydrochloride of this base is obtained by adding dry hydrogen chloride to a solution of the base in ethyl acetate.

The mother liquors of the benzene solution of the above mentioned 2'-carboxy-4'-hydroxy-phenyl 2-carbethoxyoxy-4-nitro-benzoate are evaporated and the residue is crystallised from aqueous dioxan to give an isomeric product which in alcoholic solution gives a violet coloration with ferric chloride and which is 3'-carboxy-4'-hydroxy-phenyl 2 - carbethoxyoxy-4-nitro-benzoate, M. P. 174–175° C. Partial hydrolysis of this product with dilute ammonia gives 3'-carboxy-4'-hydroxy-phenyl 2-hydroxy-4-nitro-benzoate, M. P. 175–176° C. Reduction of the latter with hydrogen in the presence of Raney nickel as described above gives 3'-carboxy-4'-hydroxyphenyl 2-hydroxy-4-amino-benzoate, M. P. 225–230° C. with decomposition.

The 2-carbethoxyoxy-4-nitro-benzoyl chloride used in this example may be obtained by the action of thionyl chloride upon the corresponding acid (M. P. 141–142° C.) which itself may be obtained by the action of ethyl chloroformate upon 4-nitro-salicylic acid.

I claim:

1. The compound 3' - carboxy - 4' - hydroxyphenyl 2-hydroxy-4-amino benzoate.

2. The compound 2' - carboxy - 4' - hydroxyphenyl 2-hydroxy-4-amino benzoate.

3. Process for the production of gentisyl p-aminosalicylates which comprises reacting gentisic acid with a compound selected from the group consisting of 2-hydroxy-4-nitrobenzoyl chloride and 2-acylated derivatives thereof, in an anhydrous solvent medium in the presence of a tertiary amino base, separating the isomeric products by crystallisation from a solvent, hydrolysing the acyl group if present and subjecting the products to catalytic hydrogenation.

4. Process according to claim 3 wherein the anhydrous solvent medium is dioxan.

5. Process according to claim 3 wherein the isomeric products are separated by crystallisation from benzene solution.

6. Process according to claim 3 wherein the hydrolysis is effected by means of an excess of dilute ammonia.

7. Process according to claim 3 wherein the reduction is effected by catalytic hydrogenation in the presence of Raney nickel catalyst.

ROBERT MICHEL JACOB.

No references cited.